United States Patent [19]

Haus et al.

[11] Patent Number: 4,720,175

[45] Date of Patent: Jan. 19, 1988

[54] COMPOSITE LOGIC GATE ELEMENT AND MULTIPLEXER FOR OPTICAL COMPUTING AND OPTICAL COMMUNICATION

[75] Inventors: Joseph W. Haus, Schenectady, N.Y.; Charles M. Bowden; Chi C. Sung, both of Huntsville, Ala.

[73] Assignee: The United States of America as represented by the Secretary of the Army, Washington, D.C.

[21] Appl. No.: 803,360

[22] Filed: Dec. 2, 1985

[51] Int. Cl.$^4$ .............................................. G02F 1/17
[52] U.S. Cl. ...................................... 350/353; 350/354
[58] Field of Search ............................... 350/353–354, 350/393

[56] References Cited

U.S. PATENT DOCUMENTS 3,610,731 10/1971 Seidel .................................. 350/354

OTHER PUBLICATIONS

Schmidt, K. P., "A 16×18 Bit CdS Spatial Modulator (page composer), *Optica Acta*, vol. 24, 1977, pp. 433–440.
Bohnert et al., "Intrinsic Absorptive Optical Bistability in CdS", *App. Phys. Lett.*, vol. 43, 12-1983, pp. 1088–1090.
Bohnert et al., "Plasma Induced Optical Nonlinearties & Optical Bistability in CdS", *Z. Phys. B. Condensed Matter*, 12-1984, pp. 263–272.
Hajto et al., "Optical Bistability Observed in Amorphous Semiconductor Films", *Philosophical Mag. B*, 1983, pp. 347–366.
S. L. McCall, "Instabilities and Continuous-Wave Light Propagation in Absorbing Media", *Physical Review A*, Apr. 1974, vol. 9, No. 4, pp. 1515–1523.
D. A. B. Miller et al., "Optical Bistability Due to Increasing Absorption", *Optics Letters*, vol. 9, No. 5, May 1984, pp. 162–164.
M. Dagenais et al., "Cavityless Optical Bistability Due to Light-Induced Absorption Cadmium Sulfide", *Applied Physics Letters*, vol. 45, No. 3, Aug. 1984, pp. 210–212.

*Primary Examiner*—William H. Punter
*Attorney, Agent, or Firm*—John C. Garvin, Jr.; Freddie M. Bush

[57] ABSTRACT

An optically bistable, nonlinear optical device that produces an output that follows two hysteresis loops for an optical intensity variation input at a given frequency. One hysteresis loop follows a clockwise path of development, the other follows a counterclockwise path when the input field or optical intensity is ramped to a large value and returned again to a small value. These features of the device are effectively engineered by controlling the temperature of the input and output faces of the device, allowing optical logic gating and multiplex operation.

7 Claims, 7 Drawing Figures

COMPOSITE LOGIC GATE ELEMENT AND MULTIPLEXER FOR OPTICAL COMPUTING AND OPTICAL COMMUNICATION

DEDICATORY CLAUSE

The invention described herein may be manufactured, used, and licensed by or for the Government for governmental purposes without the payment to us of any royalties thereon.

BACKGROUND OF THE INVENTION

Optical bistability is the phenomenon whereby an illuminated device made with a nonlinear optical material exhibits two constant light intensities at the output of the device for a given light intensity at the device input. This bistable behavior can be utilized for optical switching, optical digital memory elements, and intensity-limiting behavior, as well as transistor action (the optical counterpart of the electronic transistor). Such devices can be incorporated in all-optical communication systems, data processing systems, and logic operations in an all-optical digital computer.

First predictions of the phenomenon of optical bistability were made by A. Szöke et al, Applied Optics Letters 15, page 376 (1969); by H. Seidel, U.S. Pat. No. 3,610,731 issued in 1971; by J. W. Austin et al, Journal of Optical Society of America 61, page 650 (1971); and by E. Spiller, Journal Applied Physics 43, page 1673 (1972). The conditions for differential gain and transistor action were treated by S. L. McCall, Physical Review A, volume 9, No. 4, page 1515 (1974). This led to subsequent experiments of H. M. Gibbs et al, Physical Review Letters 36, page 113 (1976) using sodium vapor as the non-linear medium in a Fabry-Perot cavity to observe the bistable behavior and transistor type action in an all-optical experiment.

Most prior art observations of optical bistability utilized a resonator of the Fabry-Perot or ring-cavity geometry as discussed by H. J. Kimble et al, in *Optical Bistability* 2, Plenum Press, NY, 1984, page 1. However, as noted in Philosophical Magazine, Volumn 47, Number 4, pages 347–366 (1983), J. Hajto et al have analyzed the appearance of cavityless optical bistability in an amorphous medium due to an incident light-induced, temperature-dependent, increase of the absorption in the medium. This phenomenon was also subsequently observed in a GaAs multiple quantum well semiconductor material by D. A. B. Miller et al, as noted in Optics Letters, Volume 9, Number 5, page 162 (1984); and was also observed in the semiconductor CdS by tuning near the bound exciton resonance by M. Dagenais et al in Applied physics Letters 45, page 210 (1984). These experiments disclose two essential attributes of an optical bistable material: (a) nonlinear dependence of the steady-state temperature at the boundaries on the light intensity, and (b) nonlinear renormalization of the absorption resonance due to the temperature rise in the medium. These devices produce mirrorless (cavityless) optical bistability with single hysteresis loops, for the output versus input intensities, in the clockwise direction when the input field is swept past the hysteresis zone and returned to a low intensity again.

SUMMARY OF THE INVENTION

Composite logic gate operation and multiplexing for optical computing and operation is provided by an optically bistable, nonlinear optical element or device. The device responds to input optical intensity variation of a given frequency to produce an output that follows two hysteresis loops. One loop follows a clockwise path of development. The other loop follows a counterclockwise path of development. The device comprises a nonlinear optical material having thermal control means across both the input and output faces of the material for precisely controlling the temperature gradient across the material and thereby controlling the points of operation on the hysteresis loops.

BRIEF DESCRIPTION OF THE DRAWINGS

FIG. 6 is a graph, using the conditions of FIG. 5, depicting critical points of logic gate operation, representing the negation of an exclusive OR.

DESCRIPTION OF THE PREFERRED EMBODIMENT

Figure 1:
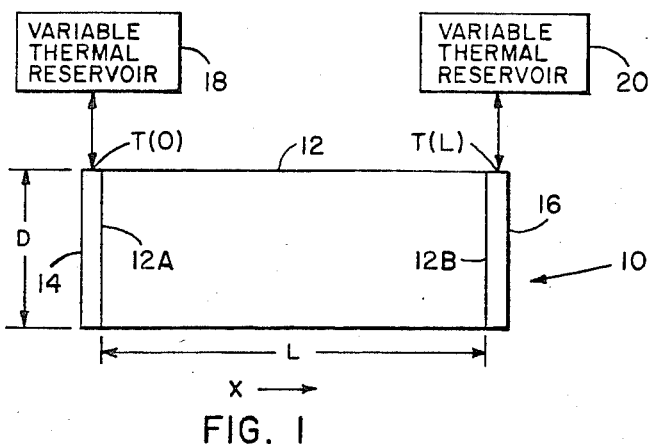
FIG. 1 is a schematic representation of a single optically-bistable device.
Figure 2:
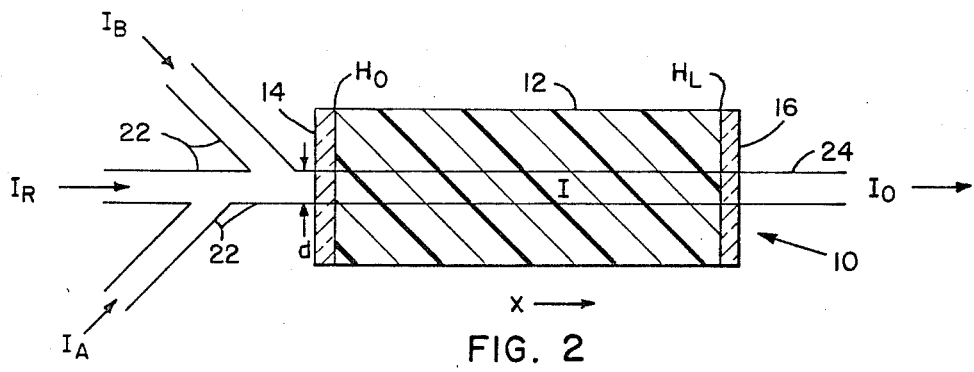
FIG. 2 is a typical cross section of the optically-bistable device of FIG. 1, showing signal flow.

Referring to the drawings wherein like numbers refer to like parts, FIGS. 1 and 2 disclose a preferred embodiment of the composite logic gate element and multiplexer. The logic gate element 10 is shown as being cylindrical but its geometric shape is not critical. Element 10 is comprised of a platelet 12 of optically nonlinear material with absorption $\alpha$ which depends upon temperature due to absorption of energy from the internal field intensity I. Dielectric films 14 and 16 of low optical reflectivity at the incident signal wavelength are joined to the respective ends 12A and 12B of element 12. Films 14 and 16 have dissimilar heat conductivity from that of the nonlinear medium and are used to control heat conductivity boundary conditions. These end surfaces are in contact with respective thermal reservoirs 18 and 20 which are controllably maintained at a specified temperature. Typically, these dielectric films may be quartz-glass plates. T(o) and T(L) represents the temperatures present on the input and output faces 12A and 12B of the device 12.

As shown in FIG. 2, input signals $I_A$, $I_B$ and a reference signal $I_R$ are coupled into the nonlinear optical material 12 by optical fibers or optical waveguides 22 using directional optical coupling at their junctions. The total output $I_o$ is coupled out in the same manner using an optical fiber or waveguide 24, the diameter of which, straddles the optical beam waist at the output.

For a nonlinear optical material such as the semiconductor cadmium sulfide (CdS), the size of the CdS is $L \approx 10$ micrometers. The optical beam spot size diameter (d) at the entrance of the element can be on the order of 5-20 micrometers with a transverse dimension (D) of the material where $D^2=0.01$ cm$^2$. Incident intensites are typically on the order of 20 mW and the device is operative at temperatures from 2° K.-50° K. Switching times are on the order of microseconds to milliseconds.

Due to the dimensions of the device (micron size), low switching intensities, and adaptivity to coupling to optical fibers and optical waveguides, this device can be readily adapted into integrated optical design for digital optical computing and digital optical data processing, as a composite logic element and intensity multiplexer.

For a laser input field of intensity, an input field of a given frequency, the optically bistable device produces two output hysteresis loops, one being clockwise as disclosed in the prior art and the other being counter-clockwise when the input field is ramped to a large value and returned again to a small value. These features, which constitute optical multi-stability, are engineered and controlled by the temperature at the input and output faces T(o) and T(L) of the material and by thermal conductivities $H_o$ and $H_L$ of the interface material (14 and 16).

Figure 5:
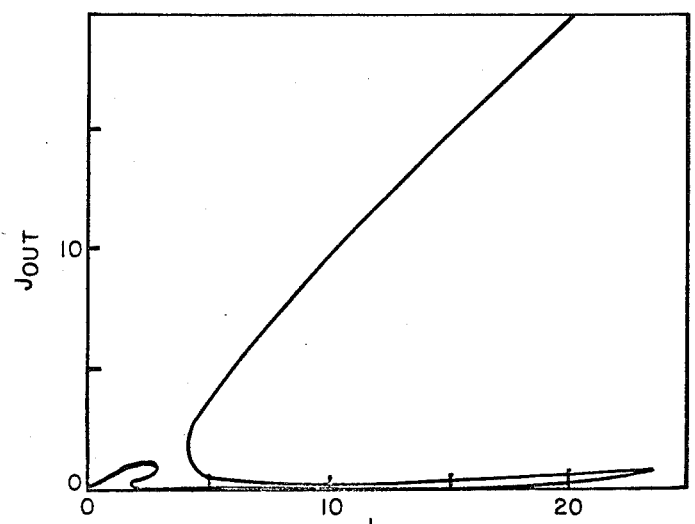
FIG. 5 is a graph of input versus output intensities for the detuning $\Delta = -4$, but with dissimilar heat conductivity boundary conditions such that $H_L = \frac{1}{3} H_o$.
Figure 6:
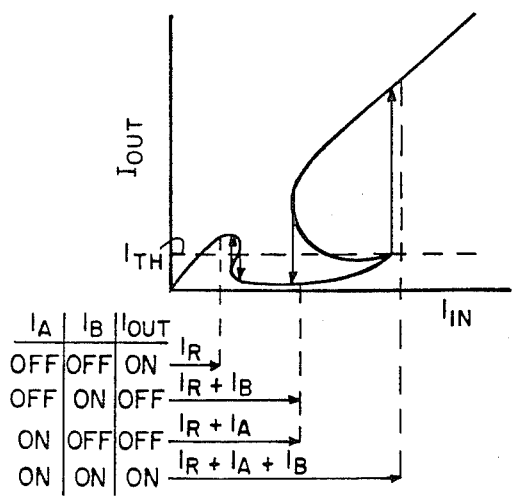

The optically bistable device can be operated as several distinct logic gates. For example, it can be operated as an exclusive-OR-gate, as a logical AND-gate, and a negation of the exclusive-OR-gate. The minimum discrimination in output optical intensity between the ON and OFF states is at least a factor of ten. The two bistable loops corresponding to an input field of a given frequency and are shown in FIG. 5. These two loops can be used for simultaneous composite logic operations for optical computing by varying the input signals as shown in FIG. 6. The truth table is represented pictorially underneath the input intensity. The device is ON, when the output intensity is greater than the threshold intensity $I_{TH}$. The arrows in the figure denote the path of the output intensity as the input intensity is raised or lowered. The introduction of a second input field can cause switch-off of the logic element characterized by one intensity and switch-on of a similar logic element characterized by another intensity, i.e., multiplexing of signals shown in FIG. 7. The switching between the two signals is done by using a clocked switching intensity $I_S$. Both of these operations can be incorporated into an integrated-optics chip or other optical microsystems as composite logic operations for optical computing with multiplexing capability.

Tyically, the platelet 12 is illuminated as shown in FIG. 2 by a laser field of intensity $I=10^{-10}$ W/$\mu$m$^2$ and frequency $\omega$ tuned just below the peak absorption frequency of the bound $I_2$ exciton in CdS (cadmium sulfide). The principles of operation and results are also operative for other materials, such as GaAs quantum well structures.

The mathematical model for the device is a set of Maxwell's equations, in the steady-state, for the forward and backward propagating waves for the electric field, $E_F^+$ and $E_B^+$, respectively, and the heat conduction equation for the temperature T, $$\partial E_F^+/\partial x + \alpha/2 E_F^+ = 0 \quad (1)$$

$$\partial E_B^+/\partial x - \alpha/2 E_B^+ = 0 \quad (2)$$

and $$\kappa \partial^2 T/\partial x^2 = \alpha I \quad (3)$$

Here, $\alpha$ is the absorption in the medium, which is given empirically for CdS by $$\alpha = 1/10[3 + 0.04(T-T_b)^2]/[1 + (\omega - \omega_o(T)^2(0.4)^2] \quad (4a)$$

with $$\omega_o(T) = \omega_o(o) - AT^2, 0 < T \lesssim 40° \text{ K.} \quad (4b)$$

as the empirically determined absorption resonance frequency which is shifted with temperature T. Here $\omega_o(o) = 20531$ cm$^{-1}$. Also, in the above equations, $\kappa = 10^{-4}$ W/$\mu$m° K., $\alpha \approx 10^{-1}$ $\mu$m$^{-1}$. For practical purposes, $\partial^2 T/\partial x^2 \approx 0$ so the internal temperature dependence is $$T(x) = T(o) + [T(L) - T(o)]x/L. \quad (5)$$

The boundary conditions associated with Eq. (3) are crucial for the existence of optical bistability and are given by $$H_x[T(x) - T_b] = I(x) \alpha(x) \left.\begin{array}{l} x = 0 \\ x = L \end{array}\right. \quad (6)$$

where $T_b$ is the ambient temperature of the environment and $H_o$ and $H_L$ are the heat resistances at each boundary and they need not be equal.

The boundary conditions for the field are less crucial for the bistability in this case, but the propagation aspect is important. The field boundary conditions are, $$I_T = \frac{2 \epsilon/\epsilon_o}{[1 + \sqrt{\epsilon/\epsilon_o}]^2} I(L) \quad (7)$$

$$I_I = \frac{1}{4} \{a^2 I_F(o) + b^2 I_B(o) + 2ab \text{ Re } (E_F^+(o) E_B^+(o))\} \quad (8)$$

where $$a = \sqrt{\frac{\epsilon}{\epsilon_i}} + 1, b = \sqrt{\frac{\epsilon}{\epsilon_i}} - 1$$

and $$I_F(x) = |E_F^+(x)|^2, I_B(x) = |E_B^+(x)|^2, I(x) =$$
$$|E_F^+(x)|^2 + |E_B^+(x)|^2,$$

and $\epsilon$, $\epsilon_o$ and $\epsilon_i$ are the dielectric constants for the medium, for the output medium, and for the input medium, respectively.

Figure 3:
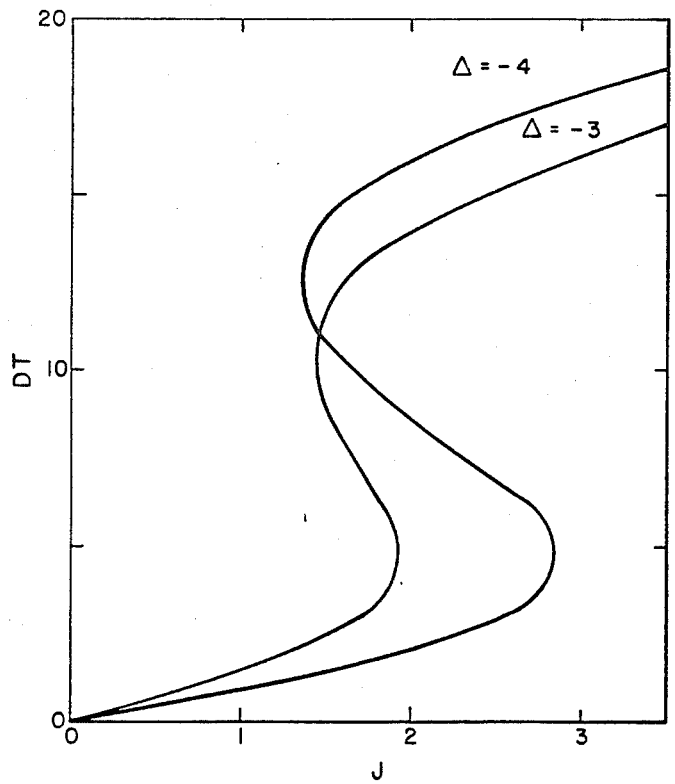
FIG. 3 is a graph of the temperature difference between the ambient surroundings and the input or output boundaries, DT versus scaled intensity for two detunings.

Using the condition of equation (6), together with (4a) and (4b), and with the definition at the boundaries $$J_x = I(x)/H_x, x = 0, L, \quad (9)$$

gives the results at the boundary for $H_o = H_L$ shown in FIG. 3, where we have defined the laser detuning from the exciton absorption as $$\Delta = \omega - \omega_o(t_b) \quad (10)$$

and $$DT = T - T_b. \quad (11)$$

Figure 4:
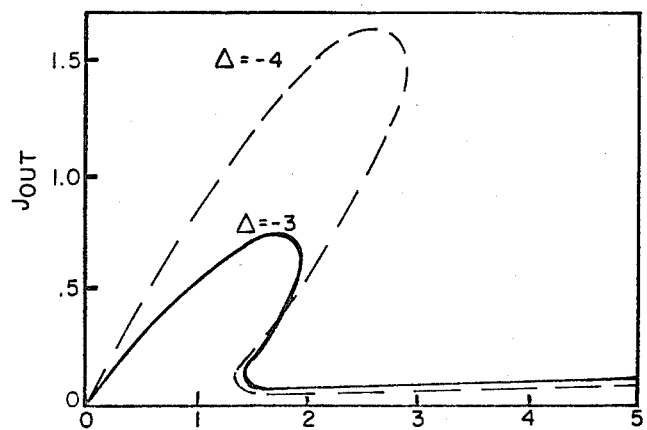
FIG. 4 is a graph of the input versus output intensities for the two detunings of FIG. 3 and $H_L = H_o$. Only one bistable regime is shown and the intensities are scaled to $H_o$.

Using these boundary conditions, integration across the sample yields the normalized output intensity, $J_{out}$, vs. the normalized input intensity, $J_{in}$, as shown in FIG. 4 for each of the values for the detuning used in FIG. 3. In FIG. 4 $H_o$ has been chosen to be equal to $H_L$. Therefore, only one bistable regime is shown and the intensities are scaled to $H_o$. On the other hand, two bistable regimes can be adjusted relative to one another by changing these thermal resistances at the boundaries, $H_L=H_o$. FIG. 5 shows the result for $H_L=H_o/3$. This corresponds to a condition where the output temperature can be larger than the input temperature. The smaller the temperature gradient across the sample, the closer the two bistable regimes become relative to one another. It is to be noted that the bistable regime appearing at the higher intensities is a result of the bistable behavior of the thermal boundary conditions at the output face. The transmission is high at large intensities for this example because the resonance frequency throughout the entire sample has been shifted past the laser frequency. Thus, it is apparent that changing the boundary heat resistance of the element 12 at faces 12A and 12B engineers the optically-bistable regimes.

Figure 7:
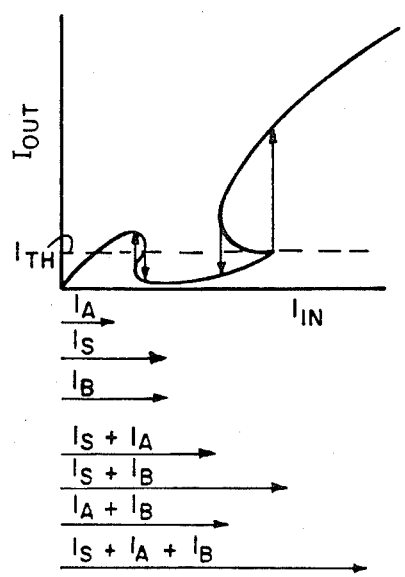
FIG. 7 is the same graph as shown in FIG. 6 showing multiplexer operation of the device with signals having different intensities.

The double hysteresis optical bistability shown in FIG. 5 can be used for composite logic operations in optical computing and integrated optics configurations. Two examples of this operation are shown in FIGS. 6 and 7. These two examples of the logic gates depicted in FIGS. 6 and 7 are suitable for parallel input fields and compatible for parallel signal processing in optical computers. Therefore, the optically bistable element constitutes a composite logic gate in a single element for optical computing. A threshold intensity $I_{TH}$ is set; below this intensity the device is OFF; otherwise the device is ON. The reference intensity $I_R$ at the input is set so that the device is ON when only this field is applied. Mixing $I_R$ with one other signal $I_A$ or $I_B$ produces an output below $I_{TH}$ and the device is OFF. When both signals are applied to $I_R$ the device is ON. This operation as depicted in FIG. 6 which constitutes the negation of an exclusive OR. Of course, by changing the levels of the intensities, the device can operate as an exclusive OR or as an AND gate, as well.

The device operated as shown in FIG. 7 uses the logic of the device in a composite way to perform a multiplexing function. A threshold is set as before and a clocked signal $I_S$ used to switch between two synchronized input signals. Signal $I_A$ is allowed to pass through only when $I_S$ is OFF. Signal $I_B$ is allowed through only when $I_S$ is ON. If $I_A$ and $I_B$ are ON, but $I_S$ is OFF, then no signal passes through the system. If all three signals are ON then $I_B$ is the received information. This mode of operation allows the passage of the information $I_B$ whenever it is desired.

For precisely controlling operation of the optical element, the temperature conductivity boundary conditions ($H_o$ and $H_L$) of the device must be controlled; i.e., the boundary condition (equation 6) required to solve the heat equation (Equation 3). This control may be readily accomplished by maintaining the different temperature reservoirs 18 and 20 as shown in FIG. 1. Alternatively, a single reservoir may be used to supply the same temperature output by using films 14 and 16 that have different heat conductivity at the respective ends. To this end nonreflecting organic or inorganic films may be used on glass having different heat conductivity.

Typically, for the alternate embodiment one film may be crystaline quartz glass and the other film may be an amorphous glass such as silicon glass.

Although the present invention has been described with reference to a preferred embodiment, workers skilled in the art will recognize that changes may be made in the form and detail without departing from the scope and spirit of foregoing disclosure. Accordingly, the scope of the invention should be limited only by the claims appended hereto.

We claim:

1. An optical device comprising: a nonlinear optical material and first and second dielectric materials, said optical material being sandwiched between said dielectric materials and having uniform surface contact therebetween for providing optical logic gate operation; said nonlinear optical material being a platelet of material having first and second primary surfaces in direct thermal contact with respective of said first and second dielectric materials for providing a temperature bias across said primary surfaces; and thermal means coupled to said first and second dielectric materials for controllably biasing the temperature of said materials.

2. An optical device as set forth in claim 1 wherein said dielectric material is a thin film deposited on the primary surface and said temperature control provides a differential temperature bias between said first and second primary surfaces that allows the output optical intensity from said nonlinear optical material to pass through first and second bistable hysteresis zones as the input signal increases from zero level to a predetermined maximum.

3. An optical device as set forth in claim 2 wherein said platelet is cadmium sulfide and said dielectric material is quartz glass film.

4. A nonlinear, optically bistable device for computing and communicating comprising: first and second films of dielectric material, a nonlinear optical material having first and second primary surfaces in complete, uniform, physical contact with respective of said first and second films for providing thermal contact therebetween and an optical path therethrough, said nonlinear optical material having two optically bistable regimes for providing optical, logic gating operation, and said dielectric films providing thermal resistor boundaries at said primary surface.

5. A nonlinear, optically bistable device as set forth in claim 4 and further comprising first and second thermal sources coupled respectively to said first and second dielectric films for establishing a controllable, variable temperature at the respective boundaries of the primary surfaces for providing a temperature gradient across the nonlinear optical material for thereby controlling the proximity of the two bistable regimes relative to one another.

6. A nonlinear, optically bistable device as set forth in claim 5 wherein said two optically bistable regimes are bistable hysteresis zones.

7. A nonlinear, optically bistable device as set forth in claim 6 wherein said nonlinear optical material is a platelet of cadmium sulfide.

* * * * *